July 7, 1953
G. R. ROESCH
2,644,343
BRAKE LEVER MECHANISM
Filed Aug. 25, 1952
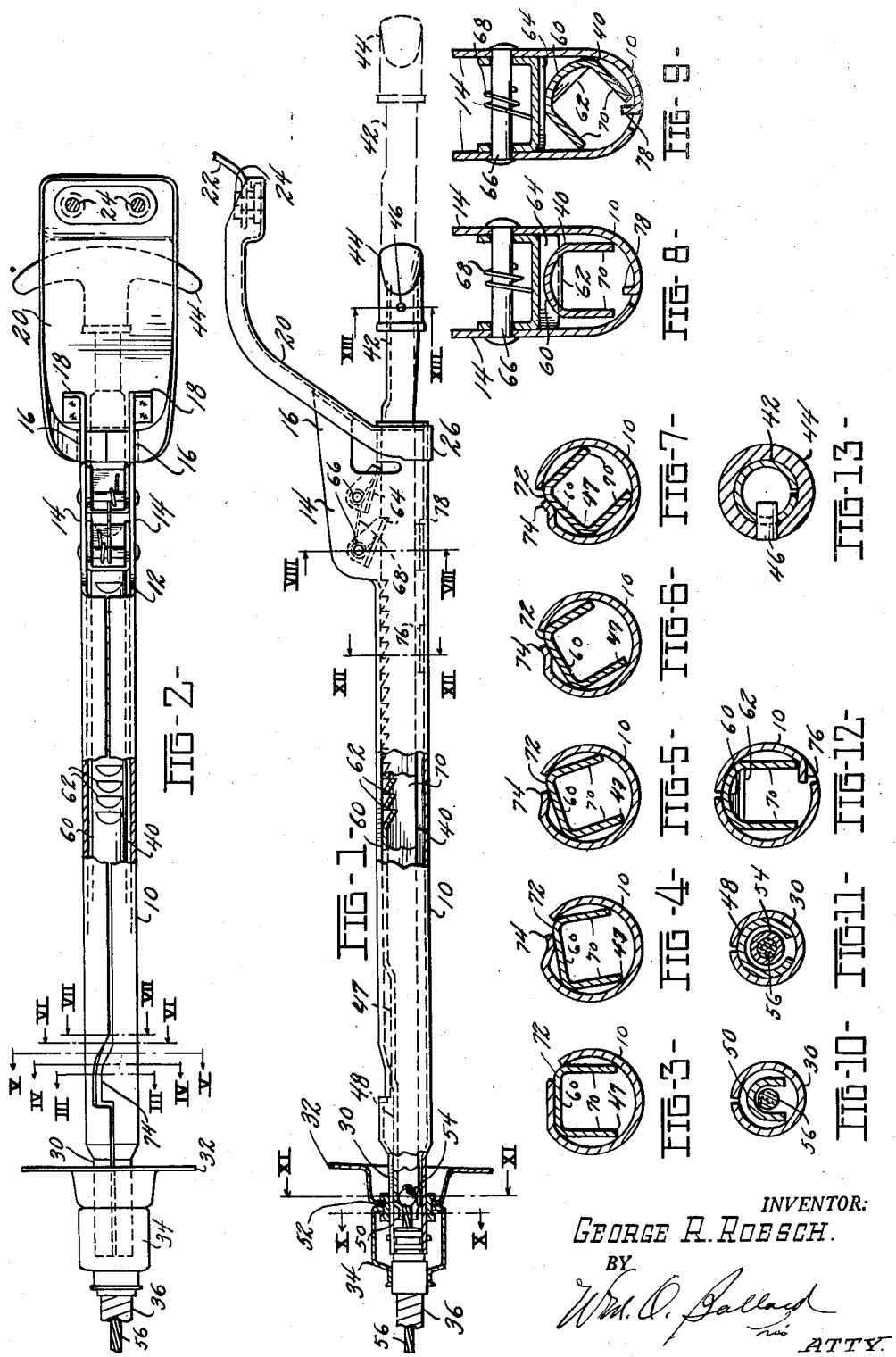
INVENTOR:
GEORGE R. ROESCH.
BY
Wm. A. Ballard
ATTY.

Patented July 7, 1953

2,644,343

UNITED STATES PATENT OFFICE 2,644,343

BRAKE LEVER MECHANISM

George R. Roesch, Toledo, Ohio, assignor to The Rush Stamping Company, Toledo, Ohio, a corporation of Ohio Application August 25, 1952, Serial No. 306,101

6 Claims. (Cl. 74—503)

This invention relates to brake control mechanisms.

An object of this invention is to provide a brake control mechanism wherein the major parts are sheet metal stampings.

Another object of this invention is to provide a brake mechanism reset control effective through telescopic movement of the parts.

Another object of this invention is to provide a mounting element configured to control all its movements of a slide therein necessary for normal brake control.

And another object of this invention is to provide a brake control mechanism having a minimum number of parts of economical construction.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation, parts being broken away, showing the brake control mechanism of the invention therein;

Fig. 2 is a plan view of the mechanism of Fig. 1;

Fig. 3 is a view on the line III—III, Fig. 2;

Fig. 4 is a view on the line IV—IV, Fig. 2;

Fig. 5 is a view on the line V—V, Fig. 2;

Fig. 6 is a view on the line VI—VI, Fig. 2;

Fig. 7 is a view on the line VII—VII, Fig. 2;

Fig. 8 is a view on the line VIII—VIII, Fig. 1;

Fig. 9 is a view similar to Fig. 8, showing the slide in rocked position;

Fig. 10 is a view on the line X—X, Fig. 1;

Fig. 11 is a view on the line XI—XI, Fig. 1;

Fig. 12 is a view on the line XII—XII, Fig. 1; and

Fig. 13 is a view on the line XIII—XIII, Fig. 1.

The primary supporting member 10 is of tubular form with one end thereof provided with a slot 12 bounded on each side by one of a pair of outwardly extending flanges 14 provided with extensions 16 terminating in offsets 18. These offsets 18 are welded to the rear face of a bracket 20, the upper end of which is attached to the lower edge of a motor vehicle dash 22 by suitable fastening elements 24. The lower end of the bracket 20 provides a seat 26 for the end of the tubular housing member 10 adjacent the flanges 14. The opposite end of the housing member 10 is provided with a reduced diameter portion 30 seated in bracket structure 32, which may be attached to the bulkhead of the motor vehicle. This reduced portion 30 may also serve as a mounting for clip 34 attaching cable housing 36 thereto. The tubular housing element 10 as mounted by brackets 20, 32, bridges the distance between the bulkhead and dash of a motor vehicle.

Reciprocably and rockably mounted within the guide 10 is a slide element 40, being U-shaped in cross-section throughout the major portion of its extent. The forward end of this slide 40 is shaped into a cylindrical terminus 42 to mount a grip element 44, which may be locked thereon by means of a pin 46 extending through the grip and the wall of portion 42. The remote end of this slide provides a first cross-sectional stepped down section 47 extending to a second cross-sectional reduced size portion 48, and finally terminating in a third cross-sectional stepped down portion 50. This final or smallest cross-sectional area of the slide provides a seat 52 between the portions 48, 50 for bead 54 serving as an anchor for brake operating cable 56. The slide extent 50 provides a sufficient width for the cable 56 to be inset therein, but prevents the bead 54 from passing therethrough. This provides an efficient locking device between the slide 40 and the cable 56 without employing any additional parts. Between the stepped down portion 47 and the first mentioned or cylindrical portion 42, the element 40 has its web portion 60 stamped to provide a series of aligned teeth 62. These teeth 62 coact with pawls 64 swingably mounted on pins 66, carried by the flanges 14, with the pawls 64 urged toward the slide 40 by a spring element 68 wrapped about the pins and engaging the pawls 64.

As the grip is pulled outwardly from the bracket 20, the slide 40 is moved therewith and the pawls and teeth coact to lock the slide 40 at any given withdrawn position, thereby setting the brakes of the motor vehicle. In order to release the mechanism and telescope the slide 40 into the guide 10, it is only necessary to rock the grip 44, which in turn rocks the slide 40 in its relationship to the guide 10 and the teeth 62 are shifted clear of the pawls 64. The pawls then engage a smooth surface of the slide adjacent one of the legs 70 as extending from the web 60, and the slide 40 can then be moved into the housing 10.

As the grip and slide approach their innermost positions, a corner or edge 72 between the web 60 and a leg 70 engages cam 74, which is of flange form turned inwardly from the body of the guide 10. This cam causes the slide 40 to be rocked back to its normal or starting position and the complete return is effective simultaneously with the slide reaching its innermost position. The corner or edge 72 is preferably on the first reduced portion 47 of the slide 40 and the abruptness with which the slide may be rocked back to a normal position is determined by the length and position of the cam 74. Additionally, the housing 10 is provided with a stop 76 to be engaged by the outer edge of a leg 70 to limit the rock of the slide 40 in its clockwise rotation. While the rotation in the opposite direction can be limited by a second stop flange 78, turned inwardly from the housing 10. These latter two stop flanges may be disposed in the region adjacent the pawls.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and it is desired to secure by United States Letters Patent:

1. In a brake controlling mechanism of the class described, a tubular guide member, a slide reciprocable and rockable in said guide member, said slide being of U-shape in cross-section providing a web with a pair of legs extending therefrom, a portion of said guide member turned inwardly to provide a cam to be engaged by an edge of the slide formed by the junction of said web and one of said legs to impart a rocking movement to the slide during a pre-selected extent of its reciprocation.

2. The structure set forth in claim 1 wherein there is a ratchet and pawl connection between said guide and slide.

3. The structure set forth in claim 1 wherein said cam includes a portion for holding said slide in fixed relationship to said guide when said slide is in its extreme position within the guide.

4. The structure set forth in claim 1 wherein a stop is provided to limit the rock of said slide within the guide.

5. The structure set forth in claim 1 wherein the guide is provided with a pair of inturned flanges to engage the legs of said slide in providing limit means for the rock of said slide within the guide.

6. In a brake controlling mechanism of the class described, a tubular guide, a slide therein having a U-shaped cross-section including a web and legs extending therefrom, said guide having a longitudinal portion thereof cross-sectionally configured to provide a cam for engaging an edge of said slide formed by the junction of said web with one of the legs, said cam imparting a predetermined rock to said slide during a portion of its reciprocation, and a grip fixed to said slide to be manually engaged for effecting reciprocation of said slide.

GEORGE R. ROESCH.

References Cited in the file of this patent

UNITED STATES PATENTS

| Number | Name | Date |
| --- | --- | --- |
| 2,154,929 | Edwards | Apr. 18, 1939 |
| 2,543,510 | Sandberg | Feb. 27, 1951 |
| 2,598,133 | Roesch | May 27, 1952 |